Dec. 12, 1950          M. J. GROENENBERG          2,533,791
                        INDICATING DEVICE
                        Filed July 9, 1946
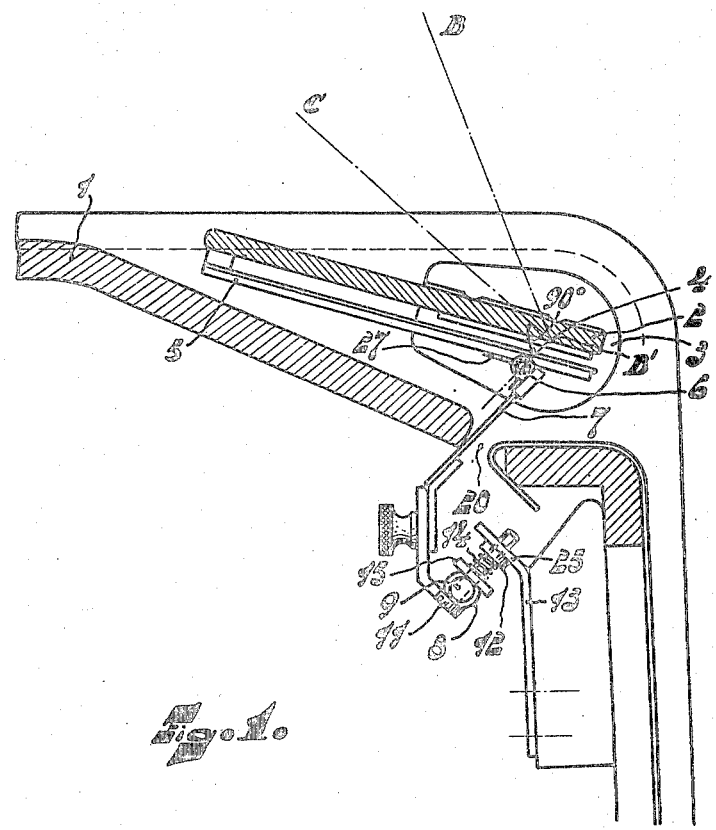
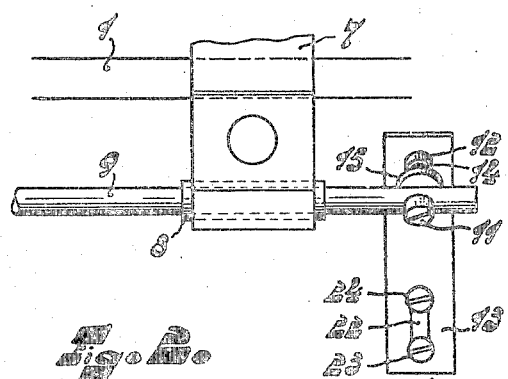
INVENTOR.
Maarten Jan Groenenberg
BY
Wendroth, Lind & Ponash
ATTORNEYS Patented Dec. 12, 1950

2,533,791

UNITED STATES PATENT OFFICE 2,533,791

INDICATING DEVICE

Maarten Jan Groenenberg, Eindhoven, Netherlands, assignor to Hartford National Bank and Trust Company, Hartford, Conn., as trustee Application July 9, 1946, Serial No. 682,215
In the Netherlands December 2, 1942

Section 1, Public Law 690, August 8, 1946
Patent expires December 2, 1962

6 Claims. (Cl. 116—124.1)

The invention relates to tuning dial arrangements, more particularly for radio apparatus, which comprise a flat and at least partly transparent scale plate which is adapted to pivot about a horizontal line and a pointer which is movable behind this scale and which consists of two portions which are connected to one another by a hinge and of which the first, also referred to hereinafter as the fixed portion of the pointer, is guided by parts rigidly connected to the apparatus whereas the second or loose portion provided for use as a dial index, is carried by the first portion.

In an indicating device of this type, which is briefly referred to hereinafter as a "tip-up scale," the transparent scale usually consists of a glass plate which is usually mounted on each of the short sides thereof in a holder, said holders forming at the same time the hinges of the scale.

These devices can be chiefly divided into those types wherein the axis of articulation of the scale coincides with that of the hinge of the pointer and those wherein the axis is located in the plane of the scale. With the former it is most easy to guarantee the correct position of the pointer in every position of the scale but with the latter it is possible, to make the pivoted holders much smaller than with the former. In the first case the diameter of the holders approximately exceeds that in the second case by double the distance between the scale and the axis of articulation. Besides, in the second case the generally present lamps for illuminating the scale, which lamps must be located beside the scale in the hinges, may be arranged in the axis of articulation, which further simplifies the construction.

The last-mentioned construction entails, however, the draw-back that when giving the scale another position the spindle of the pointer hinge performs slight displacements along the scale in a direction perpendicular to the axis of the latter and that, in addition, the distance between this hinge and the scale is subject to small variations. It is clear that attempts should be made to reduce these variations as far as possible. To that end care must be taken to ensure that the path followed by the hinge during the displacement of the pointer, is located close to the axis of the scale and extends exactly parallel to the said axis.

Due to the tolerances which are necessary in the dimensions of the casing of the apparatus and of the other components concerned and which have to be admitted in the manufacture, it is necessary to adjust the position of that portion of the pointer which is guided by parts rigidly connected to the apparatus.

The invention provides a construction which permits to bring about this adjustment in a simple and efficacious manner.

According to the invention, this adjusting device operates in a direction perpendicular to the intermediate position of the tip-up scale. It has been found that differences in the manufacture of the casings of the apparatus can be compensated to a large extent with the aid of very simple means of adjustment and with the adjustment in only one direction it is possible to correctly position the fixed portion of the pointer.

According to one advantageous form of construction, the fixed portion of the pointer is supported by a guiding rail and bears on an edge of the casing. In an indicating device wherein the scale is located outside the casing of the apparatus and wherein the fixed portion of the pointer projects to the outside through a slit in the casing, the fixed pointer portion may be pressed against an edge of this slit. This has the advantage that in the manufacture of the casings it can easily be ensured that this edge is exactly parallel to the axis of the scale.

A second advantage of this form of construction is that with this construction the slit may become very narrow.

This pressure may be exerted by a spring arranged in the hinge of the pointer whilst in this case the loose portion of the pointer exerts a reaction on the tip-up scale.

According to one advantageous form of construction the guiding rail and the edge of the casing are located in a plane which is perpendicular to the intermediate position of the scale. The position of the guiding rail may be adjustable, for example, owing to the fact that the fixation members of the guiding rail are constituted by screws whose axes are perpendicular to the intermediate position of the scale whilst under each of the screws are clamped one end of the guide and a resilient element.

The invention will be explained more fully with reference to the accompanying drawing wherein Fig. 1 and Fig. 2 represent a lateral elevation and a rear-view respectively of the indicating device according to the invention.

These figures represent a sectional view of a portion of the wall 1 of the casing of a radio receiver. This casing comprises a tuning indicator having a flat glass dial scale 2 each of the short sides of which is mounted in a holder 3 arranged in the end wall portions of the casing. These holders and therefore also the scale 2 can rotate about an axis 4 which is perpendicular to the plane of the drawing of Fig. 1. Along the back-side of the glass dial scale is a movable pointer which consists of two portions, a fixed portion 7 and a loose portion 5 which is connected to the former by means of a hinge 6. The fixed portion 7 passes through a slit 20 to the exterior of the casing of the receiver; within this casing the portion 7 terminates in a guiding shoe 8 (see also Fig. 2) which is slidable along a guide 9. Within the hinge there is provided a spring 27 by which the end of the loose pointer portion 5 is pressed against the upper edge of the scale. The reaction of this pressing force is taken up by the edge of the slit 20 of the casing of the receiver. By means of screws 11 the guiding rail 9 is secured to straps 13 to which are welded a few nuts 12. Under the guiding rail there are furthermore arranged a ring 15 and a spring 14. The strips 13 are secured to the casing of the receiver with the aid of two screws 23 and 24.

The dial scale is shown in the completely tipped-down position; it can be raised as far as to the poistion indicated by the line B; the intermediate position is indicated by the line C. The straps 13 each comprise a portion 25 which is curved so as to be parallel to this intermediate position and the screws 11, which bring about the adjustment of the guiding of the pointer, are perpendicular to this portion 25 so that the hinge is displaced during the adjustment in a direction perpendicular to this intermediate position.

The pivoted scale holders 3 are constructed in such manner that the axis 4 about which the scale can rotate is located approximately in the back-face of the scale. Due to the distance between the pointer hinge and the axis, the loose pointer portion moves, when the scale is raised and lowered, along this scale in a direction perpendicular to the axis of the scale. Moreover, the distance between the pointer hinge and the scale varies. As has already been mentioned, it is necessary for reasons of manufacture to be able to adjust the position of the pointer hinge relatively to the scale axis. Besides, it has been found in practice that greatest attention should be paid to the distance between the hinge and the scale. The illumination of the pointer is usually directly dependent upon this distance so that if irregularities occur therein they greatly manifest themselves during operation. The adjustment of the portions of the pointer in other directions may therefore be dispensed with. It is consequently possible that a simple adjustment of the pointer is sufficient. For adjusting the indicating device according to the invention, we proceed as follows: With the aid of the straps 13 the fixed portion of the pointer 7 is brought into a position perpendicular to the plane of the dial scale at the intermediate position of the dial scale. The position of this fixed pointer portion is also determined in this case by the edge of the slit. Then the distance between the pointer hinge and the scale is given the correct value by means of the screws 11, that is to say at each of the end travel positions of the pointer, the corresponding screw 11 is adjusted to bring the pointer hinge adjacent to the dial scale. It is thus guaranteed that the distance between the scale and the pointer has the correct value for every position of the scale and of the pointer itself.

What I claim is:

1. An indicating device for radio apparatus, comprising a substantially transparent scale plate member, an index member, a guide support means for the said index member and adjusting means for the said support, said plate member being adapted to rotate through an intermediate position about a horizontal axis parallel to the plane of the said scale plate, said index member being positioned behind the said plate member and consisting of a first portion mounted for movement on the said guide portion and a second portion being connected to the said first portion by a hinge portion and being supported by the said first portion, said adjusting means being rigidly connected to the said apparatus, said first portion bearing on a portion of the said apparatus, said hinge portion being adjustable to the said scale plate member in one direction only by means of the said adjusting means in a direction approximately perpendicular to the plane of said scale plate in its intermediate position.

2. An indicating device for radio apparatus enclosed within a slotted casing, comprising a substantially transparent scale plate member, an index member, a guide support means for the said index member and adjusting means for the said support, said plate member being adapted to rotate through an intermediate position about a horizontal axis parallel to the plane of the said scale plate, said index member being positioned behind the said plate member and consisting of a first portion mounted for movement on the said guide portion and a second portion being connected to the said first portion by a hinge portion and being supported by the said first portion, said adjusting means being rigidly connected to the said apparatus, said first portion of said index member bearing against one side of the said slotted portion of the said casing, said hinge portion being adjustable relative to the said scale plate member in one direction only by means of the said adjusting means in a direction approximately perpendicular to the plane of said scale plate in its intermediate position.

3. An indicating device for radio apparatus enclosed in a casing provided with a slot, comprising a substantially transparent scale plate member rotatably mounted on the outside of the casing, an index member, a guide support means for the said index member and adjusting means for the said support, said plate member being adapted to rotate through an intermediate position about a horizontal axis parallel to the plane of the said scale plate, said index member being positioned behind the said plate member and consisting of a first portion mounted for movement on the said guide portion and a second portion being connected to the said first portion by a hinge portion and being supported by the said first portion, said guide support means mounted within said casing on said support means, said first portion passing through said slot to the outside of said casing and bearing upon an edge of the said slot, said hinge portion being adjustable relative to the said scale plate member in one direction only by means of the said adjusting means in a direction approximately perpendicular to the plane of said scale plate in its intermediate position.

4. An indicating device for radio apparatus enclosed in a casing provided with a slot, comprising a substantially transparent scale plate member rotatably mounted on the outside portion of the casing, an index member, a guide support means for the said index member and adjusting means for the said support, said plate member being adapted to rotate through an intermediate position about a horizontal axis parallel to the plane of the said scale plate, said index member being positioned behind the said plate member and consisting of a first portion mounted for movement on the said guide portion and a second portion being connected to the said first portion by a resilient hinge portion and being supported by the said first portion, said guide support means mounted within said casing on said support means, said first portion passing through said slot to the said hinge portion, said second portion being acted upon by said resilient hinge portion to exert a pressure against said scale member, said hinge portion being adjustable relative to the said scale plate member in one direction only by means of the said adjusting means in a direction approximately perpendicular to the plane of said scale plate in its intermediate position.

5. An indicating device for radio apparatus enclosed in a casing provided with a slot, comprising a substantially transparent scale plate member rotatably mounted on the outside portion of the said casing, an index member, a guide support means for the said index member and adjusting means for the said support, said plate member being adapted to rotate through an intermediate position to a full position about a horizontal axis parallel to the plane of the said scale plate, said index member being positioned behind the said plate member and consisting of a first portion mounted for movement on the said guide portion and a second portion being connected to the said first portion by a spring-tensioned hinge portion and being supported by the said first portion, said guide means mounted within the said casing on said support means, said first portion passing through said slot against one edge of the said slot to the said hinge portion, said second portion being acted upon by the said hinge portion to exert a pressure against said scale member, said edge of said slot and said guide support being located in a plane which is perpendicular to the said intermediate position of the scale member, said hinge portion being adjustable relative to the said scale plate member in one direction only by means of the said adjusting means in a direction approximately perpendicular to the plane of said scale plate in its intermediate position.

6. An indicating device for radio apparatus enclosed in a casing member provided with a slot, comprising a substantially transparent scale plate member, an index member, a guide support means for the said index member and adjusting means for the said support, said plate member being adapted to rotate through an intermediate position about a horizontal axis parallel to the plane of the said scale plate, said index member being positioned behind the said plate member and consisting of a first portion mounted for movement on the said guide portion and a second portion being connected to said first portion by a resilient hinge portion and being supported by the said first portion, said guide support means comprising screws having axes perpendicular to the plane of said scale member at the intermediate position of the said scale member and resilient elements, said guide being held between the heads of the said screws and the said resilient means, said hinge portion being adjustable relative to the said scale plate member in one direction only by means of the said adjusting means in a direction approximately perpendicular to the plane of said scale member at its intermediate position.

MAARTEN JAN GROENENBERG.

REFERENCES CITED

The following references are of record in the file of this patent:

FOREIGN PATENTS

| Number | Country | Date |
|---|---|---|
| 376,090 | Italy | Oct. 31, 1939 |
| 424,720 | Great Britain | Feb. 27, 1935 |